United States Patent
Peacock et al.

(10) Patent No.: US 11,745,850 B2
(45) Date of Patent: Sep. 5, 2023

(54) AIRCRAFT WING BOX

(71) Applicant: AIRBUS OPERATIONS LIMITED, Bristol (GB)

(72) Inventors: Antony Charles Peacock, Bristol (GB); Paul James Edwards, Bristol (GB); Phillip Scott, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 224 days.

(21) Appl. No.: 17/217,696

(22) Filed: Mar. 30, 2021

(65) Prior Publication Data
US 2021/0300521 A1    Sep. 30, 2021

(30) Foreign Application Priority Data

Mar. 31, 2020   (GB) ..................................... 2004721

(51) Int. Cl.
*B64C 3/34*    (2006.01)
*B64D 37/08*   (2006.01)
*B64C 3/18*    (2006.01)

(52) U.S. Cl.
CPC .................. *B64C 3/34* (2013.01); *B64C 3/18* (2013.01); *B64D 37/08* (2013.01)

(58) Field of Classification Search
CPC .......... B64C 3/34; B64D 37/08; B64D 37/06; B64D 37/00; B64D 37/02; B64D 37/04; B64D 37/05; B64D 37/10
See application file for complete search history.

(56) References Cited

U.S. PATENT DOCUMENTS

| 8,167,245 B1 | 5/2012 | Koehler et al. | |
| 11,543,029 B2 * | 1/2023 | Wu | B64D 37/02 |
| 11,613,376 B2 * | 3/2023 | Peacock | B64C 3/34 |
| | | | 244/135 R |
| 2010/0051749 A1 | 3/2010 | Tanner | |
| 2010/0107513 A1 * | 5/2010 | Buchanan | B64C 3/18 |
| | | | 52/84 |
| 2012/0091269 A1 * | 4/2012 | Lopez-Reina | B64D 45/02 |
| | | | 244/1 A |

(Continued)

FOREIGN PATENT DOCUMENTS

| EP | 1 544 099 | 6/2005 | |
| EP | 1544099 A1 * | 6/2005 | B64C 1/06 |

(Continued)

OTHER PUBLICATIONS

Translation of KR 20180082153 A, Jul. 2018. (Year: 2018).*
Combined Search and Examination Report for GB Application No. 2004721.3 dated Jan. 7, 2021, 12 pages.

*Primary Examiner* — Joshua J Michener
*Assistant Examiner* — Ryan Andrew Yankey
(74) *Attorney, Agent, or Firm* — Nixon & Vanderhye P.C.

(57) ABSTRACT

An aircraft wing box is disclosed having a first cover, a second cover, a partition extending between the first and second cover and configured to provide a fuel tight boundary between the first and second covers, a first joint coupling the partition to the first cover, and a second joint coupling the partition to the second cover. The first joint is a slip joint configured to inhibit fuel leakage across the slip joint whilst permitting relative movement between the partition and the first cover.

20 Claims, 10 Drawing Sheets

(56) References Cited

U.S. PATENT DOCUMENTS

| | | | |
|---|---|---|---|
| 2016/0176499 A1* | 6/2016 | Evans | B64C 3/26 244/123.1 |
| 2020/0031489 A1* | 1/2020 | Edwards | B64D 37/005 |
| 2020/0031499 A1* | 1/2020 | Petit | F16L 3/18 |

FOREIGN PATENT DOCUMENTS

| | | | | |
|---|---|---|---|---|
| EP | 2942282 A1 | * | 11/2015 | B60K 15/03 |
| EP | 3 461 747 | | 4/2019 | |
| GB | 2515044 A | * | 12/2014 | B64C 3/20 |
| KR | 20180082153 A | * | 7/2018 | B60K 15/03 |
| WO | 2009/050510 | | 4/2009 | |

* cited by examiner

AIRCRAFT WING BOX

CROSS REFERENCE TO RELATED APPLICATION

This application claims priority to United Kingdom Patent Application GB 2004721.3, filed Mar. 31, 2020, the entire contents of which is hereby incorporated by reference.

FIELD OF THE INVENTION

The present invention relates to an aircraft wing box including a partition forming part of a fuel tight boundary, and a method of accessing a rib bay of the aircraft wing box.

BACKGROUND OF THE INVENTION

Aircraft wings are designed to bend during flight, resulting in the development of brazier loads. Brazier loads are a phenomenon caused by a structure's resistance to the applied bending, which tends to try to force the cross-section of the structure to flatten. When a wing is bent, the upper and lower covers of an aircraft wing are therefore urged towards each other by the brazier loads.

The brazier loads are typically resisted by chordwise ribs, with the ribs separated in the spanwise direction of the wing, such that the distance between the covers remains fixed at the rib locations.

Even so, any structure that extends between the upper and lower covers, at a location away from the ribs, will typically need to be reinforced so that it is able to resist the brazier loads. For example, the boundary between adjacent fuel bays typically extends from the upper cover to the lower cover.

SUMMARY OF THE INVENTION

A first aspect of the invention provides an aircraft wing box, comprising: a first cover; a second cover; a partition extending between the first and second cover and configured to provide a fuel tight boundary between the first and second covers; a first joint coupling the partition to the first cover; and a second joint coupling the partition to the second cover, wherein the first joint is a slip joint configured to inhibit fuel leakage across the slip joint whilst permitting relative movement between the partition and the first cover.

The partition may consist of a chordwise rib, but since chordwise ribs prevent the covers from crushing inwards when the wing bends, this is not preferred. Thus more preferably the wing box comprises: a fuel tank with a fuel-tight boundary, wherein the partition provides part of the fuel-tight boundary of the fuel tank; forward and aft spars, wherein each cover is attached to each spar; inboard and outboard ribs, wherein each rib is joined to each cover, joined to the partition and joined to one or both of the spars; wherein each cover is joined to the partition by a respective partition-cover joint; and wherein one of the partition-cover joints is the first slip joint.

A second aspect of the invention provides an aircraft wing box comprising: a fuel tank with a fuel-tight boundary; upper and lower covers; forward and aft spars; inboard and outboard ribs; and a partition, wherein: each cover is attached to each spar; each rib is joined to each cover, joined to the partition and joined to one or both of the spars; each cover is joined to the partition by a respective partition-cover joint; the partition provides part of the fuel-tight boundary of the fuel tank; and at least one of the partition-cover joints is a slip joint which permits relative movement between the cover and the partition, and is sealed to inhibit fuel leakage out of the fuel tank across the slip joint.

The following comments apply to each aspect of the invention, where applicable.

The slip joint permits relative movement between the cover and the partition, which limits the transmission of brazier loads to the partition. This enables the partition to be lighter, which improves the fuel efficiency of the aircraft.

The slip joint may be configured to provide a sliding connection, typically a vertically sliding connection, between the cover and the partition.

Each cover may be attached to each spar by a respective cover-spar joint, or each cover may be integrally formed with one or both of the spars.

The slip joint may comprise a support member which couples the partition to the first cover.

The support member may comprise a foot which is attached to the first cover; and a blade which extends away from the first cover.

The support member may comprise a stringer. The stringer may extend along a majority of a length of the wing box.

The slip joint may include an elastomeric seal configured to inhibit fuel leakage across the slip joint.

The elastomeric seal may be compressed between the partition and the support member.

The elastomeric seal may contact the blade of the support member.

The elastomeric seal may have a sealing surface which is configured to permit a sliding motion during the relative movement between the partition and the first cover.

The slip joint may comprise a first elastomeric seal on a first side of the support member and a second elastomeric seal on a second side of the support member.

The elastomeric seal may comprise a sealing surface which is flattened where it is compressed between the partition and the support member, and curved (for instance cylindrical) in its uncompressed state before assembly of the slip joint.

The elastomeric seal may further comprise a flat sealing surface which is compressed between the partition and the support member, and is flat in its uncompressed state before assembly of the slip joint.

A rib may be positioned between and fixed to the first and second covers, wherein an end of the partition is substantially fixed to the rib such that relative movement between the partition and the first cover is substantially restricted at said end.

A second rib may be positioned between and fixed to the first and second covers, wherein a second end of the partition is substantially fixed to the second rib such that relative movement between the partition and the first cover is substantially restricted at said second end.

The wing box may have a spanwise direction extending from an inboard root to an outboard tip, wherein the partition extends in a direction having a spanwise component.

The partition may extend in the spanwise direction, or within 45 degrees of the spanwise direction.

The partition may comprise an elastomeric diaphragm, but more preferably the partition is rigid.

The partition may comprise a diaphragm with a planar web.

The second joint may be a second slip joint configured to inhibit fuel leakage across the second slip joint whilst permitting relative movement between the partition and the second cover.

The first cover and/or the second cover may include a manhole.

A further aspect of the invention provides a method of accessing a bay of the aircraft wing box, comprising: accessing the wing box through the manhole in the first or second cover, disconnecting the partition from the first and second covers, and removing the partition to provide access to the bay.

In the case where the wing box has first and second slip joints, then the partition may be disconnected from the first and second covers by dis-assembling the first and second slip joints.

In the case where the wing box has only a single slip joint, then the partition may be disconnected from the first cover by dis-assembling the slip joint, and disconnected from the second cover by removing fasteners for example.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
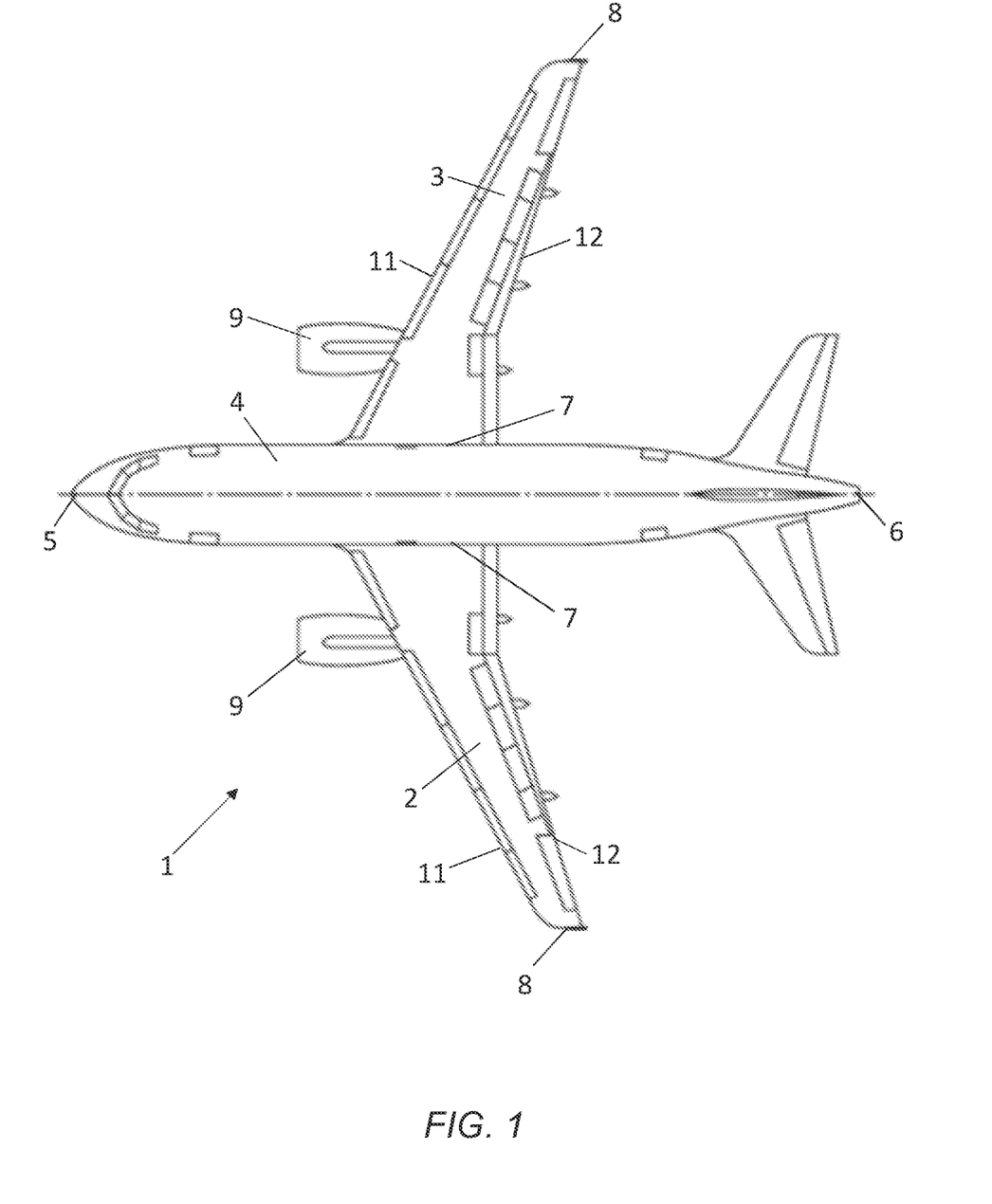
FIG. 1 shows a plan view of an aircraft.

FIG. 1 shows an aircraft 1 with port and starboard fixed wings 2, 3, and a fuselage 4 with a nose 5 and a tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines 9 attached to the wings or fuselage.

Each wing 2, 3 has a cantilevered structure with a length extending in a spanwise direction from a wing root 7 to a wing tip 8, the wing root 7 being joined to the fuselage 4. The wings 2, 3 are similar in construction, so only the port wing 2 will be described in detail with reference to the following Figures.

In the following description, the terms "front" or "forward" refer to components towards a leading edge 11 of the wing, and the terms "rear" or "aft" refer to components towards a trailing edge 12 of the wing. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1. Similarly, the terms "inboard" and "outboard" refer to the relative positions of features in the spanwise direction of the wing box. That is, an inboard component is closer to the root of the wing box than an outboard component, and an outboard component is closer to the tip of the wing box than an inboard component.

Figure 2:
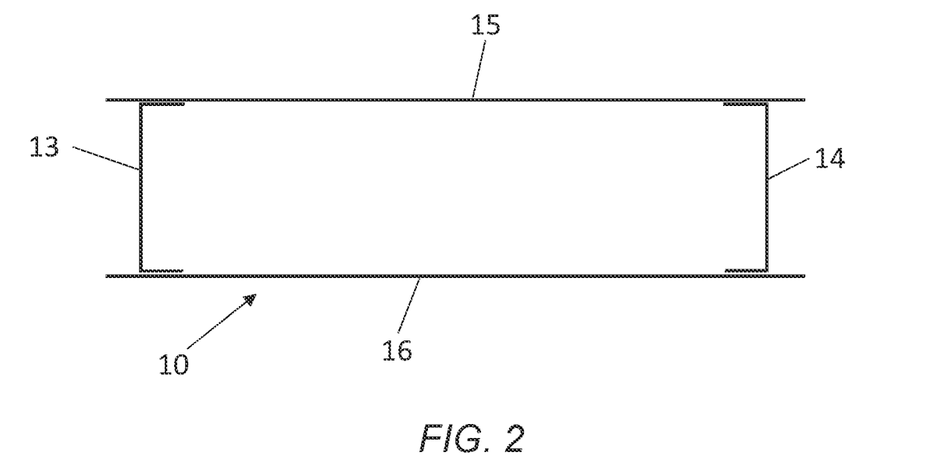
FIG. 2 shows a schematic view of the wing box of the port wing.

FIG. 2 shows a schematic view of a wing box 10 of the port wing 2 of the aircraft 1. The wing box 10 is a support structure arranged to support a significant proportion of the loads on the wing 2. The wing box 10 has a forward spar 13 which forms the front boundary of the wing box, an aft spar 14 which forms the rear boundary of the wing box, an upper cover 15 and a lower cover 16.

Each of the elements 13-16 of the wing box extend substantially the entire length of the wing 2 from a root 7a of the wing box 10 (which typically coincides with the root 7 of the wing 2) to a tip 8a of the wing box 10 (which may coincide with the tip 8 of the wing 2, or the tip 8 of the wing may be a wingtip device such as a winglet). The upper cover 15 and lower cover 16 have outer aerodynamic surfaces. The wing 3 also includes a leading edge structure (not shown) and a trailing edge structure (not shown) that are aerodynamically shaped to combine with the wing box 10 to form an aerofoil shaped body.

The covers 15, 16 may be reinforced with stringers. Stringers are typically spanwise extending reinforcing members attached to the inside of the covers 15, 16. Each stringer extends along a majority of the length of the wing box from the root 7a to the tip 8a.

Figure 3:
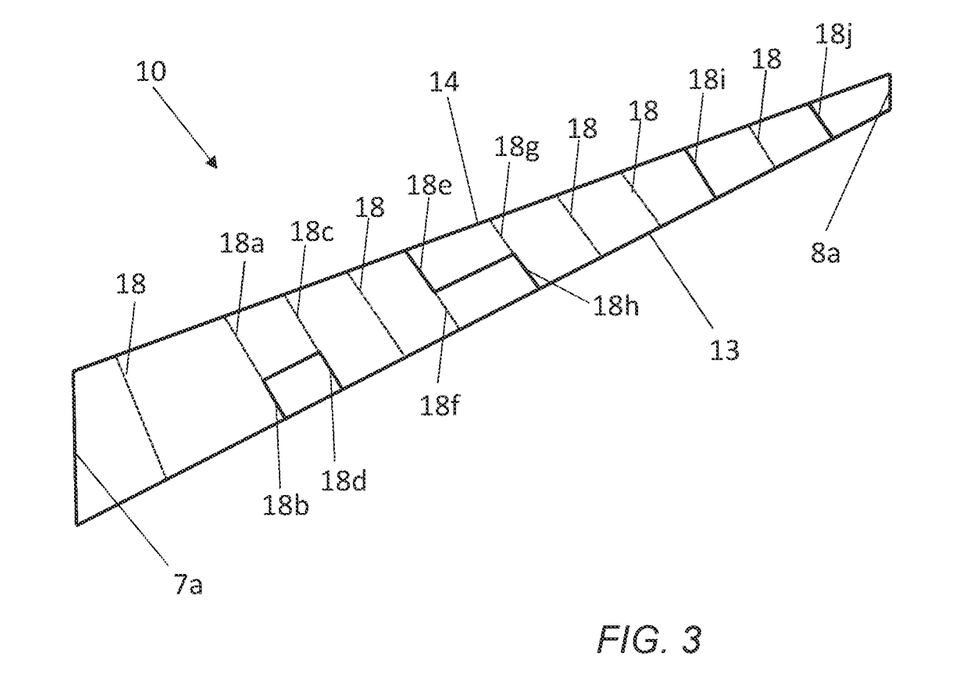
FIG. 3 is a plan view showing an arrangement of ribs and fuel tank boundaries along the wing box of the port wing.

As shown in FIG. 3, the wing box 10 also includes a plurality of chordwise ribs extending between the spars 13, 14 and between the covers 15, 16. The ribs are spaced along the spanwise direction of the wing 2, with each rib defining a rib plane. The rib plane of each rib extends substantially parallel to each adjacent rib plane, although it will be understood that the orientation of adjacent ribs with respect to each other may vary. The ribs are arranged as part of an aircraft fuel system, such that some of the ribs are baffle ribs 18 designed to allow at least some free-flow of fuel across the rib plane (indicated by a dotted line), some ribs 18i, 18j are fully sealed to form a fuel-tight boundary substantially preventing fuel freely flowing across the rib plane (indicated by a solid line), and some ribs include two portions: a rib portion 18a, 18c, 18f, 18g designed to allow at least some free-flow of fuel across the rib plane (indicated by a dotted line) and a rib portion 18b, 18d, 18e, 18h designed to form a fuel-tight boundary substantially preventing fuel freely flowing across the rib plane (indicated by a solid line).

The number of baffle ribs 18 may vary from what is shown in FIG. 3, which is schematic only.

Figure 4:
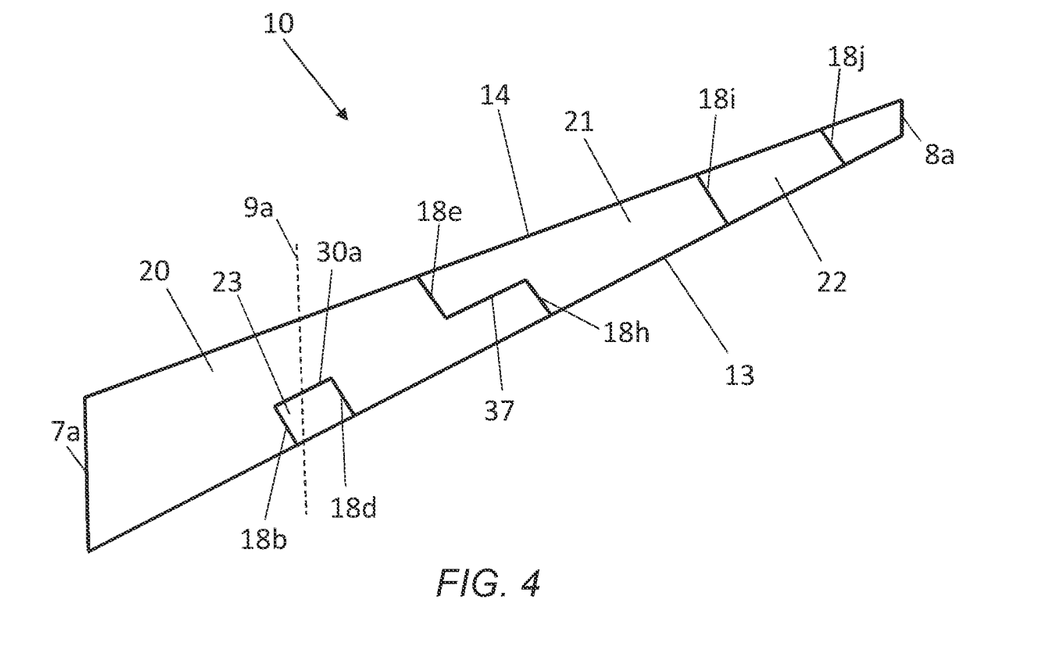
FIG. 4 is a plan view of the fuel tank arrangement of the port wing.

FIG. 4 shows a plan view of the wing box 10 in which only the sealed ribs 18i, 18j and sealed rib portions 18b, 18d, 18e, 18h forming the fuel-tight boundaries are shown.

The wing box 10 contains an inner tank 20, an outer tank 21, and a vent tank 22 shown in FIG. 4. The inner wing tank 20 is adjacent the root 7a of the wing box, the outer wing tank 21 is generally outboard of the inner wing tank 20, and the vent tank 22 is located outboard of the outer wing tank 21 and towards the tip 8a of the wing box. Each of these tanks 20, 21, 22 forms part of an aircraft fuel system that supplies fuel to the engines 9.

Each of the fuel tanks 20, 21, 22 is bounded by a fuel-tight boundary. Some portions of the fuel-tight boundary are external parts of the wing box (for example covers and spars) and other are internal (for instance ribs etc). The internal portions of the fuel-tight boundary are referred to below as partitions, since they generally provide a partition between internal spaces within the wing box.

The upper and lower portions of the boundary of each fuel tank are provided by the covers 15, 16; and the forward and rear portions of the boundary of each fuel tank are provided by the spars 13, 14.

The partition between the outer tank 21 and the vent tank 22 is formed by an outboard rib 18$i$ that prevents fuel freely flowing between the two respective tanks 21, 22. The partition between the inner tank 20 and the outer tank 21 is formed by a rearward portion 18$e$ of a first (inboard) rib; a forward portion 18$h$ of a second (outboard) rib; and a diaphragm 37 extending between the first and second ribs that will be discussed in further detail below.

The partition between the inner and outer fuel tanks 20, 21 is therefore Z-shaped, having a first portion 18$e$ (inboard portion) extending in a substantially chordwise direction, a second portion 18$h$ (outboard portion) extending in a substantially chordwise direction, and a third portion (diaphragm 37) between the first and second chordwise portions 18$b$ extending in a substantially spanwise direction.

The wingbox 10 also includes a dry-bay 23 adjacent to the engine 9. The engine's centre-line is indicated by a dashed line 9$a$. The boundary between the inner fuel tank 20 and the dry-bay 23 is a fuel-tight partition ensuring that fuel from the inner tank 20 is prevented from leaking into the dry-bay 23. The partition between the inner tank 20 and the dry-bay 23 is formed by a forward portion 18$b$ of a first (inboard) rib; a forward portion 18$d$ of a second (outboard) rib; and a diaphragm 30$a$ extending in a substantially spanwise direction between the first and second ribs.

The design of this fuel tank lay-out, including the position of the dry-bay 23, is partly driven by certification requirements relating to unconstrained engine rotor failure, and so is at least partially dependent on the position of the wing-mounted engine 9. Fuel tank layouts may also necessitate consideration of, e.g., individual fuel tank volumes, weight distribution across the wings 2, 3, and fuel system routing (e.g. fuel lines), among a number of other factors. In this particular case, this has resulted in fuel tank boundaries that have a component 30$a$, 37 extending in a substantially spanwise direction.

In flight, the aircraft wings 2, 3 bend significantly, resulting in the development of brazier loads. Brazier loads are a result of a phenomenon in which the bending of a beam structure results in longitudinal tension and compression that resists the applied bending moment but tends to flatten the cross-section of the beam structure. In the particular example of the aircraft wings 2, 3, this results in the upper cover 15 and lower cover 16 being urged towards each other by the brazier loads during bending of the wing 2, 3.

The ribs are designed to resist the brazier loads, such that the upper cover 15 and lower cover 16 maintain their respective distances from each other at each rib plane. In between the ribs, the wing structure is relatively unconstrained such that the upper and lower covers 15, 16 are able to move up and down relative to each other. For instance, the distance between the upper and lower covers 15, 16 at a spanwise position away from a rib plane may increase or decrease by approximately 2.5 mm.

Any spanwise portions of the fuel tank boundaries may therefore need to be reinforced to resist the brazier loading, adding additional complexity and weight to the wing assembly.

In this case, the brazier loads transmitted to the diaphragm 37 is reduced using slip joints, as discussed with reference to FIGS. 5A to 13.

Figure 5A:
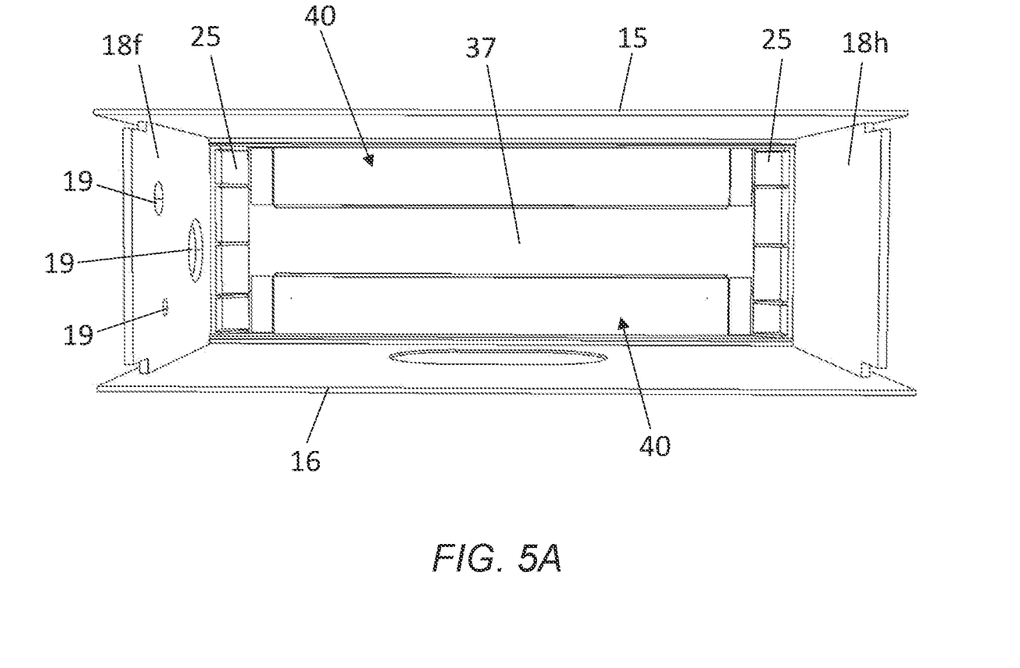
FIG. 5A shows a fuel-tight boundary according to an example of the invention, viewed in an aft direction.

FIG. 5A shows part of the Z-shaped fuel-tight boundary 18$e$, 37, 18$h$ between the inner and outer wing tanks.

FIG. 5A shows the forward portion 18$h$ of the outboard rib and the forward portion 18$f$ of the inboard rib. The forward portion 18$f$ of the inboard rib and the rearward portion 18$g$ (not shown in FIG. 5) of the outboard rib include a number of holes 19 that can allow fuel to freely flow between the fuel bays on either side of the rib plane.

The diaphragm 37 is coupled to each of the inboard and outboard ribs by rib posts 25, and to each of the covers 15, 16 by partition-cover joints which are slip joints 40 that will be explained in further detail in relation to FIGS. 6A-13.

Figure 5B:
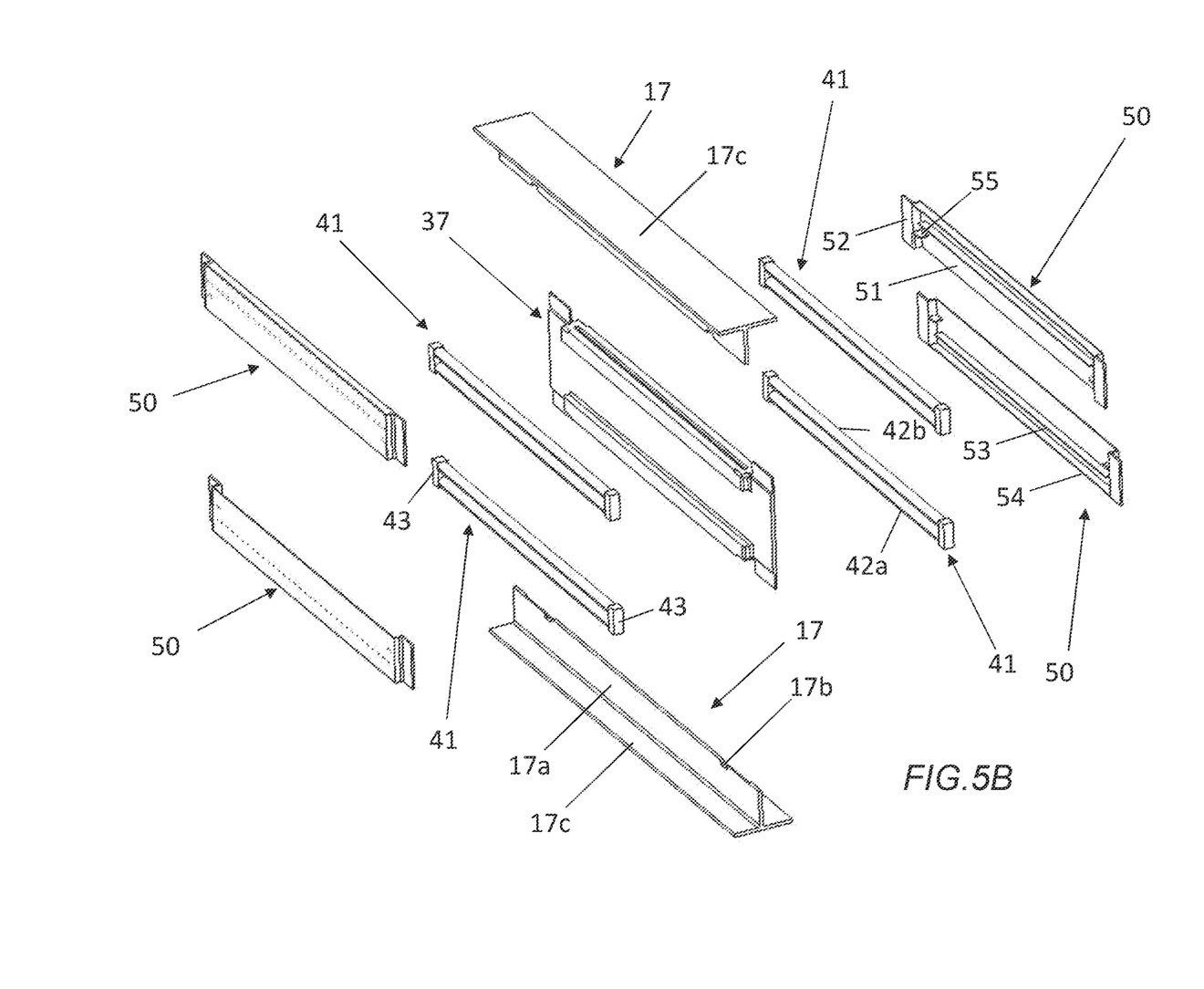
FIG. 5B is an exploded view of a diaphragm assembly and a pair of stringers.

FIG. 5B is an exploded view showing the various parts of the diaphragm assembly. The diaphragm assembly comprises a diaphragm 37; and a pair of slip joints 40, each slip joint comprising two elastomeric seals 41, two retainer plates 50 and a stringer 17.

Each seal 41 includes a pair of cylindrical elastomeric seal members 42$a$, 42$b$. The seal members 42$a$, 42$b$ are joined at each end by a cuboid elastomeric seal block 43. The seal members 42$a$, 42$b$ and seal block 43 are co-moulded from a single piece of elastomeric material.

FIG. 5B also shows a pair of stringers 17. Each stringer 17 has a blade 17$a$ with a pair of notches 17$b$, and a stringer foot 17$c$ which is attached to one of the covers 15, 16 (for instance by fasteners and/or by co-curing).

Figure 6A:
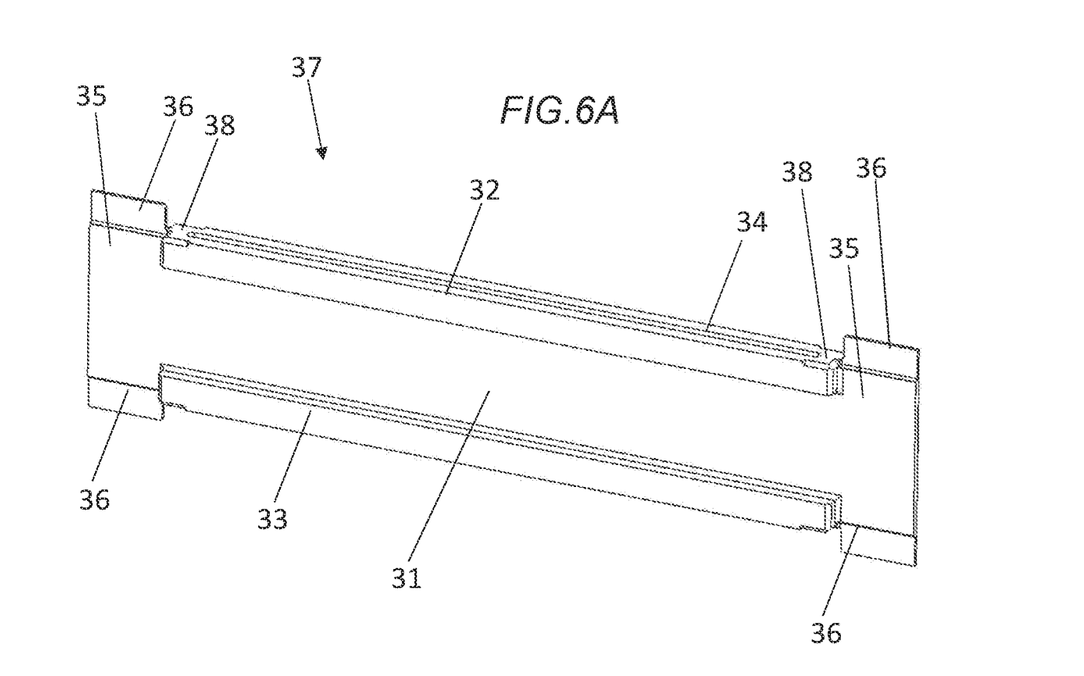
FIG. 6A shows the diaphragm.
Figure 6B:
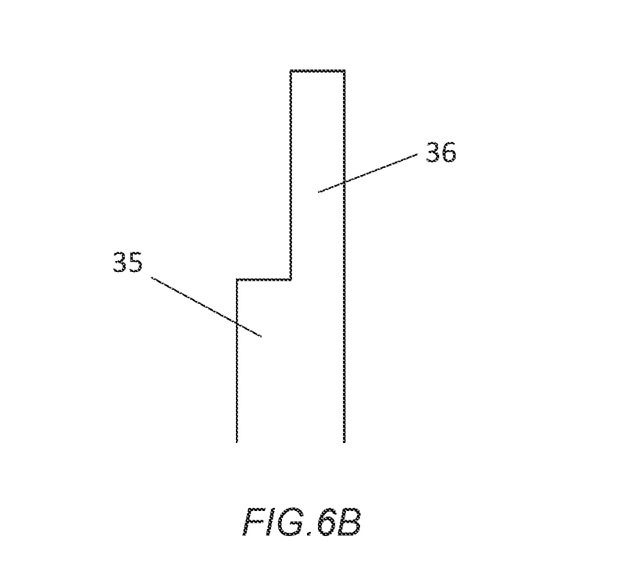
FIG. 6B shows a side profile view of part of the diaphragm.
Figure 7:
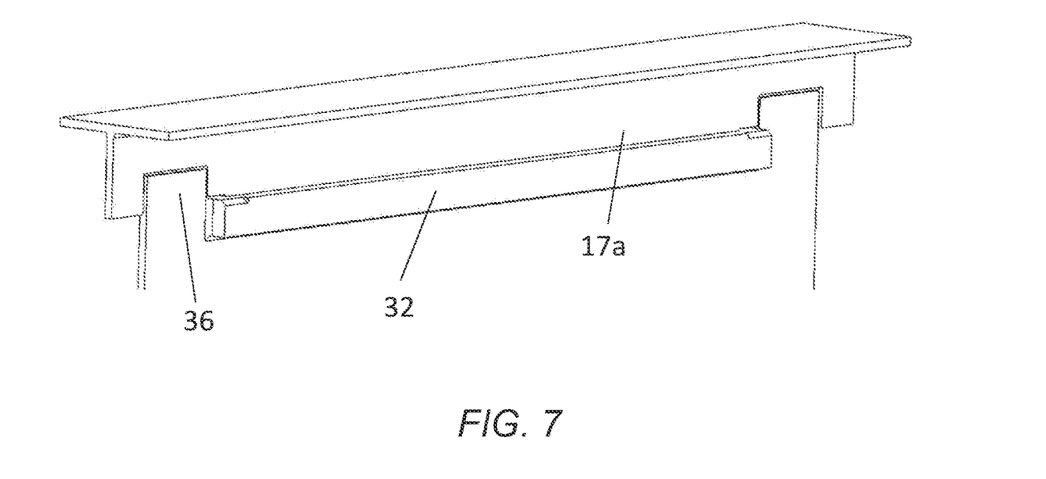
FIG. 7 shows the diaphragm attached to a stringer of the upper cover.

FIG. 6A shows the diaphragm 37, which includes a planar web 31 between upper and lower mounting blocks 32, 33. The web 31 extends out past the mounting blocks 32 into an end region 35 that provides a suitable attachment portion for attachment to the rib posts 25. Above and below this end region 35 is a tab 36 where the diaphragm has been thinned from one side to provide a mating surface for one of the retainer plates 50. A side profile view of the tab 36, and part of the end region 35 is shown in FIG. 6B.

The mounting blocks 32, 33 each include a slot 34 which runs along most of the length of the mounting block and terminates just short of the end of the block so that each block has a raised portion 38 at each end.

The construction of the diaphragm 37 provides sufficient rigidity to ensure fuel pressures exerted laterally across the boundary between the fuel bays is resisted by the diaphragm web 31, as well as to substantially prevent pressure shocks being transmitted across the fuel boundary.

Figure 8:
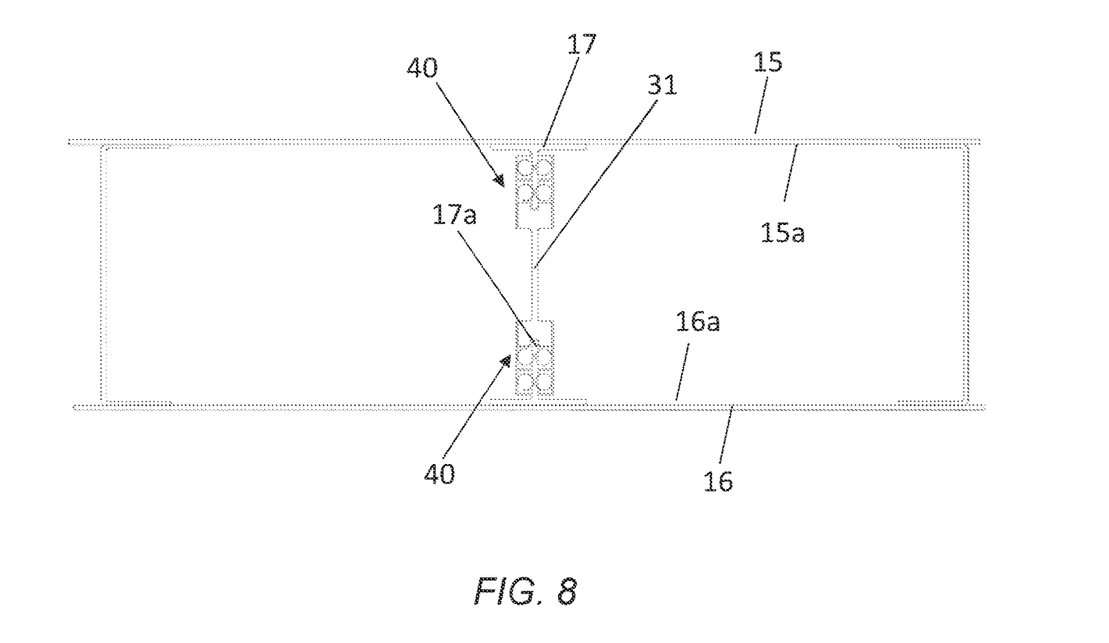
FIG. 8 shows the diaphragm attached between the upper and lower covers by slip joints.
Figure 9:
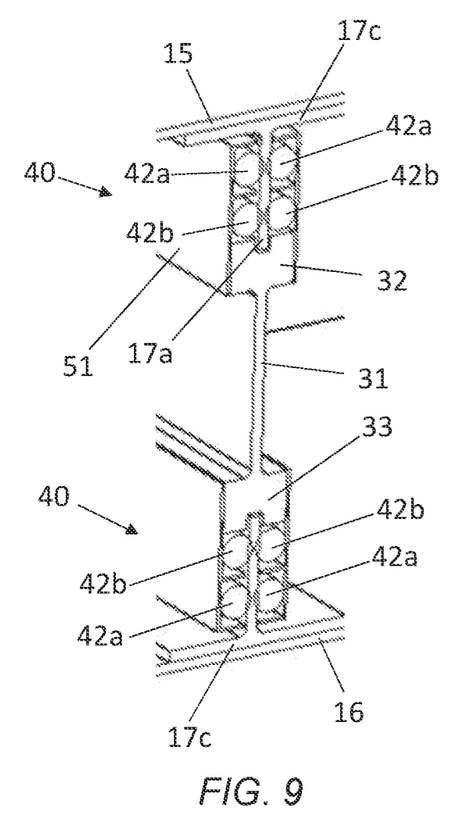
FIG. 9 shows a cross-sectional view of the slip joints.

The diaphragm 37 is fitted between the upper and lower covers 15, 16 as shown in FIGS. 8 and 9. Each cover 15, 16 comprises a skin with an inner surface 15$a$, 16$a$ labelled in FIG. 8 and an aerodynamic outer surface. The inner surface 15$a$, 16$a$ of each skin carries stringers which run in the spanwise direction along a majority of the length of the wingbox. Only a single stringer 17 is shown in the drawings (one stringer per cover) to simplify the drawings, but in practice there may be a large number of stringers per cover. The blade 17$a$ of each stringer extends away from the skin into the wing box 10 and towards the opposite cover.

As shown in FIGS. 8 and 9, the blade 17$a$ of each stringer 17 slots into a respective slot 34 of the diaphragm 37, with the raised portions 38 of the mounting block received in the notches 27$b$ at the edge of the blade 17$a$. The depth of each slot 34 is chosen to allow sufficient relative vertical movement between the diaphragm 37 and the cover 15, 16 to prevent brazier loading forces from transferring into the diaphragm 37.

FIG. 8 shows a cross-section of the wing box 10 taken equidistant between the inboard and outboard ribs 18*i*, 18*j*, showing the slip joints 40 between the diaphragm 37 and each cover 15, 16.

Each slip joint 40 includes four seal members 42*a*, 42*b*—an outer seal member 42*a* and an inner seal member 42*b* on each side of the slip joint 40. Each slip joint 40 allows relative sliding movement between the diaphragm 37 and the stringer 17 but inhibits fuel flow via the slip joint 40. By having four seal members 42*a*, 42*b*, rather than one or two, a more tortuous path is created to inhibit fuel flow via the slip joint 40.

The seal members 42*a*, 42*b* are held between the pair of retainer plates 50. One of the retainer plates 50 is shown in more detail in FIGS. 10A and 10B, along with its associated seal 41.

Figure 10A:
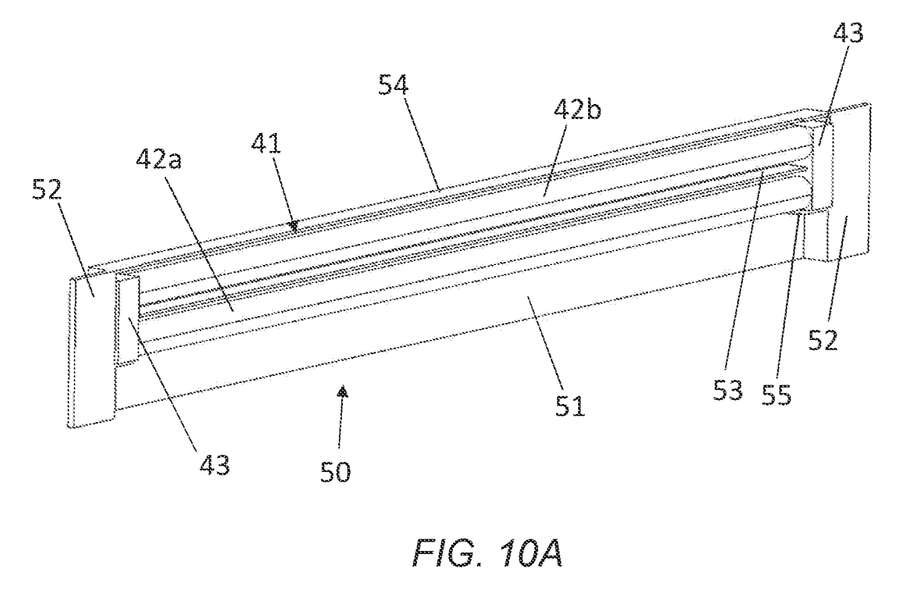
FIG. 10A shows a retaining plate and seal assembly.
Figure 10B:
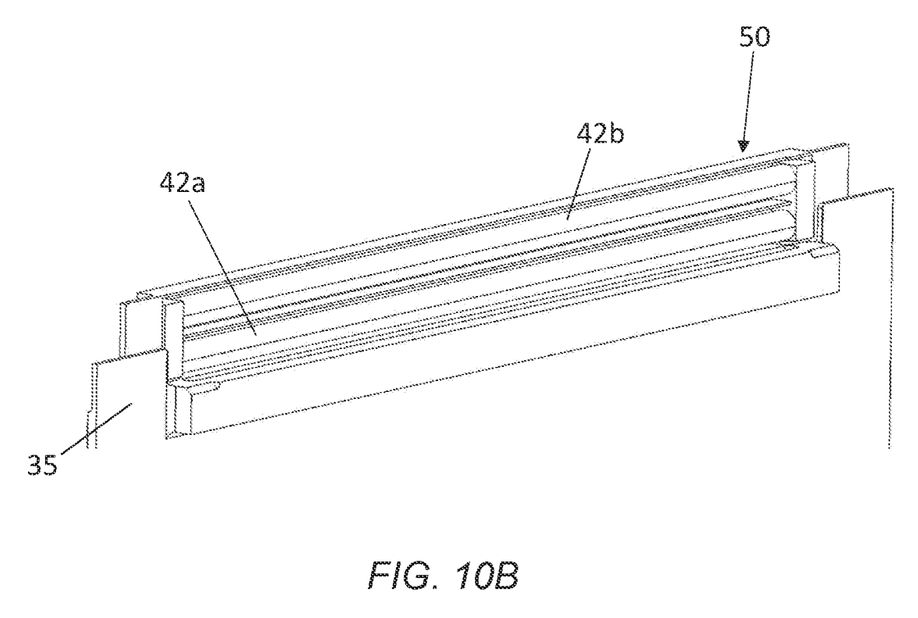
FIG. 10B shows the assembly of FIG. 10A attached to a diaphragm.

The seal members 42*a*, 42*b* are each circular in cross-section when they are in their uncompressed state before assembly of the slip joint. This curved outer profile helps to form an effective dynamic seal to seal the slip joint during any relative movement between the diaphragm 37 and one of the covers 15, 16.

Towards the ends of the seal 41 the profile changes shape, in particular the two seal members 42*a*, 42*b* merge to form a cuboid elastomeric block 43 at the ends of the seal 41 that has a rectangular cross-section.

The change in cross-section at the ends of the seal member 41 is in response to the rib posts 25 restricting relative movement between the diaphragm 37 and the ribs 18*e-h*. As any brazier loading acting at the ribs 18*e-h* is substantially supported by the ribs themselves, relative displacement between the two covers 15, 16 at the location of a rib plane is restricted, and so there is no need to accommodate relative movement between the diaphragm 37 and the stringer 17 at the ribs 18*e-h*. This lack of relative movement means that the seal 41 in this case is designed to provide an effective static seal arrangement adjacent to each rib 18*e-h*.

As shown in FIG. 10A, each retainer plate 50 includes a base plate 51 and two side tabs 52 which can be fixedly attached to the tabs 35 by suitable means, for example by fasteners. The seal members 42*a*, 42*b* are separated from each other by a separating wall 53. The inner ends of the blocks 43 are constrained by parts 55.

FIG. 10B shows one of the retainer plates 50 attached to the diaphragm 37. In attaching the retainer plate 50 to the diaphragm 37, the seals 41 on each side are pressed against the stringer blade 17*a* to form fuel-tight seals. The seal 41 allows relative movement between the stringer 17 and the diaphragm 37, whilst inhibiting fuel passage via the slip joint 40.

Note that FIGS. 8 and 9 show the seal members 42*a*, 42*b* in their uncompressed state with a circular cross-section. As they are pressed against the stringer blade 17*a* by the retainer plates 50, they become compressed between the retainer plates and the stringer blade 17*a*, and the cylindrical sealing surfaces of the seal members 42*a*, 42*b* will flatten accordingly. The planar sealing surfaces of the blocks 43 are planar both before and after compression.

The sealing surfaces of the cylindrical seal members 42*a*, 42*b* have minimal stiction. This enables each stringer blade 17*a* to remain in sliding contact with the seal member 42*a*, 42*b* as it moves up and down to permit the relative movement between the diaphragm 37 and the cover.

Figure 11:
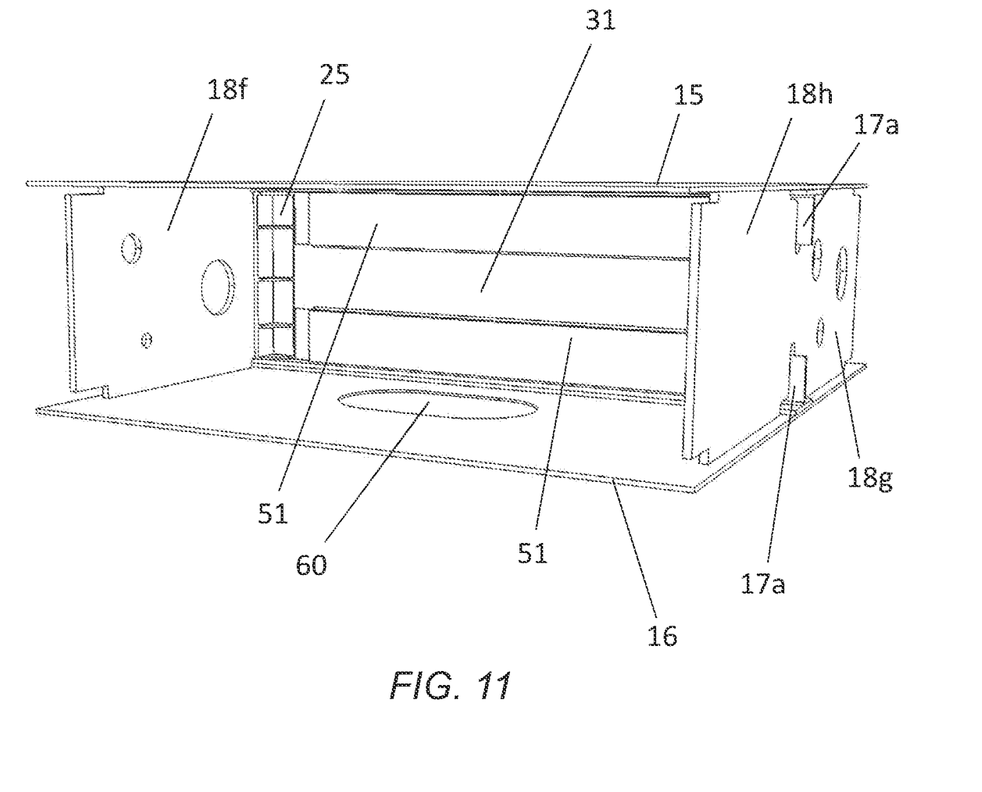
FIG. 11 shows a perspective view of the wing box.

FIG. 11 shows the attachment of the diaphragm 37 to the outboard rib 18*h*, 18*g* and the inboard rib 18*f*, 18*e*. As previously discussed, the ribs and the diaphragm form part of a fuel-tight boundary separating adjacent fuel tank bays of an aircraft wing 2. It may be necessary at times to physically inspect the inside of the wing box 10 or the fuel-tight boundary.

In order to provide access to the wing box 10, the lower cover 16 includes a manhole 60.

Due to a number of reasons, including the added weight related to covering the manhole 60 and the shallowness of certain portions of the wing section, it is not always possible or practical to install manholes 60 in all areas of the aircraft wing 2.

Figure 12:
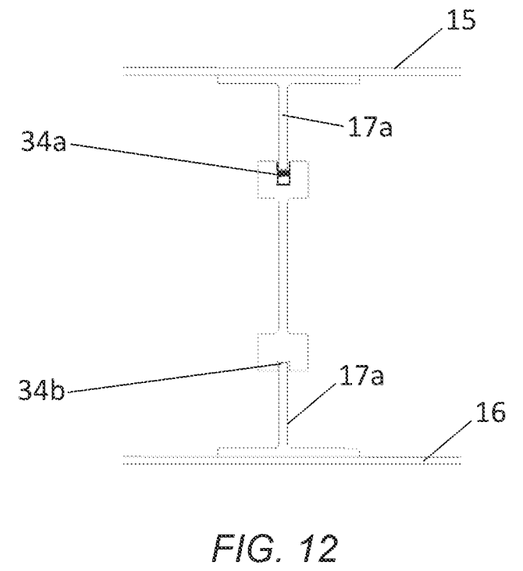
FIG. 12 shows a cross-sectional view of an alternative slip joint arrangement with a deeper grove in the upper slip joint.

FIG. 12 shows a sectional view of the diaphragm 37, but modified so that an upper slot 34*a* of the diaphragm that receives the stringer blade 17*a* of the upper cover 15 has been made deeper than the opposite slot 34*b* that receives the stringer blade 17*a* of the lower cover 16. This arrangement allows the diaphragm to be removed more easily from between the stringers 17. The diaphragm 37 is removed by first removing the retainer plates 50 and the seals 41, for example by unfastening any fasteners, and then lifting the diaphragm up towards the upper cover 15 until the stringer blade 17*a* of the lower cover 16 exits the lower slot 34*b*. The diaphragm can then be rotated and removed.

Figure 13:
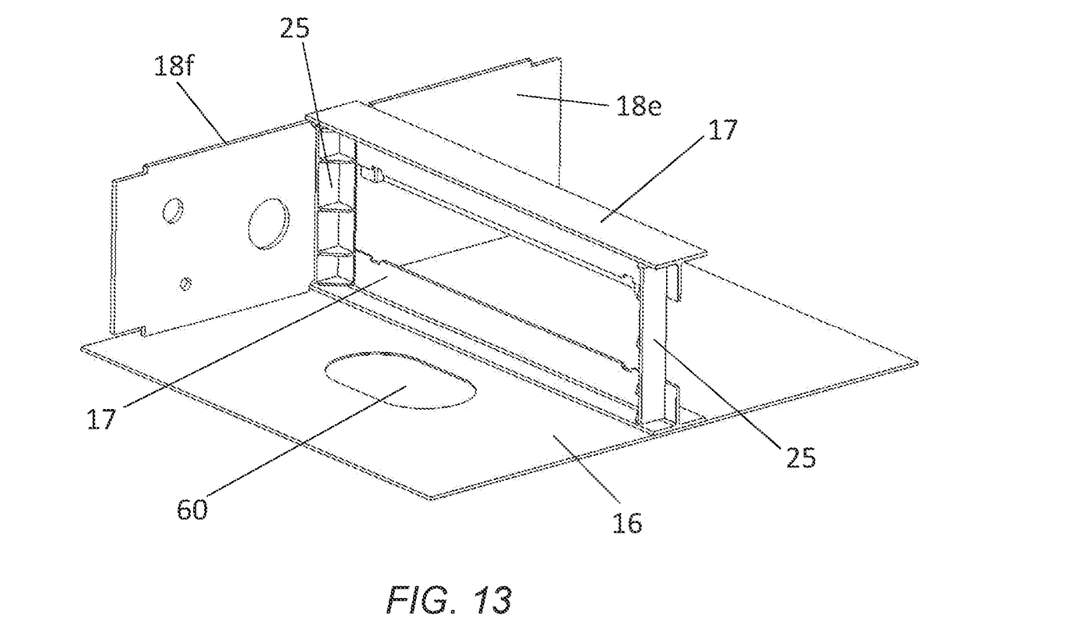
FIG. 13 shows a perspective view of the wing box with the diaphragm removed.

FIG. 13 shows a view of the wing box 10 in which the upper cover 15 and outboard rib 18*g*, 18*h* are not shown for illustrative purposes, and in which the diaphragm 37 has been removed as described above. This allows access between adjacent fuel bays without the need for direct access via a manhole in each fuel bay. As the diaphragm is removable, the diaphragm therefore has the dual function of an access panel between adjacent fuel bays. The diaphragm 37 may be kept within the wing box 10, alternatively the manhole 60 may be suitably sized to allow removal of the diaphragm from the wing box 10 through the manhole 60.

Although the invention has been described above with reference to one or more preferred embodiments, it will be appreciated that various changes or modifications may be made without departing from the scope of the invention as defined in the appended claims.

For instance, the slip joint 40 has been discussed in relation to the spanwise diaphragm 37 of a Z-shaped fuel boundary 18*e*, 37, 18*h*, however the slip joint 40 could also be used to provide relative movement between any fuel-tight boundary, such as the diaphragm 30*a* between the inner fuel tank 20 and the dry-bay 23. The slip joint 40 is particularly effective at mitigating the effects of brazier loading along spanwise structures that are not directly supported by the ribs 18, however the slip joint 40 may also be used for a chordwise extending diaphragm, particularly at a chordwise location away from a rib plane in which the covers 15, 16 may not be effectively supported and so there is some relative movement between the covers 15, 16. In some examples, the diaphragm may extend at an angle greater than 0 degrees and less than 90 degrees to the chordwise and spanwise directions of the wing, for example at 30 degrees or 45 degrees to the chordwise and/or spanwise directions.

The invention has been described in relation to the use of two slip joints 40, however it will be apparent that in some cases the mitigation of brazier loads can be effected by the use of a single slip joint 40 adjacent either the upper or lower cover 15, 16, the joint with the other cover being a rigid joint.

The slip joint 40 may extend along the entire length of the diaphragm 37, or it may extend along only a portion of the diaphragm.

In the previous examples, the partition comprises a diaphragm 37 with a planar web 31. In alternative examples the partition may be curved, for example having a curved concave forward surface facing the forward spar and a curved convex aft surface facing away from the forward spar. Alternatively the partition may have a zig-zag profile.

The stringers 17 shown in the previous examples are spanwise extending reinforcing members attached to the inside of the covers 15, 16. Alternatively, each stringer 17 may be a support member whose primary function is to support the slip joint rather than perform any significant load bearing function.

Where the word 'or' appears this is to be construed to mean 'and/or' such that items referred to are not necessarily mutually exclusive and may be used in any appropriate combination.

The invention claimed is:

1. An aircraft wing box, comprising:
a first cover;
a second cover;
a partition extending between the first and second cover and configured to provide a fuel tight boundary between the first and second covers;
a first joint coupling the partition to the first cover; and
a second joint coupling the partition to the second cover,
wherein the first joint is a slip joint configured to inhibit fuel leakage across the slip joint whilst permitting relative movement between the partition and the first cover,
a fuel tank with a fuel-tight boundary, wherein the partition provides part of the fuel-tight boundary of the fuel tank;
wherein each cover is joined to the partition by a respective partition-cover joint; and one of the partition-cover joints is the first slip joint;
wherein the first slip joint includes an elastomeric seal configured to inhibit fuel leakage across the first slip joint;
wherein the first slip joint includes a pair of retainer plates supporting the elastomeric seal; and,
wherein the pair of retainer plates mates with opposing sides of the partition.

2. An aircraft wing box according to claim 1, wherein the slip joint comprises a support member which couples the partition to the first cover.

3. An aircraft wing box according to claim 1, wherein the elastomeric seal is compressed between the partition and a support member.

4. An aircraft wing box according to claim 1, wherein the elastomeric seal has a sealing surface which is configured to permit a sliding motion during the relative movement between the partition and the first cover.

5. An aircraft wing box according to claim 3, wherein the slip joint comprises a first elastomeric seal on a first side of the support member and a second elastomeric seal on a second side of the support member.

6. An aircraft wing box according to claim 3, wherein the elastomeric seal comprises a curved sealing surface which is flattened where it is compressed between the partition and the support member, and curved in its uncompressed state.

7. An aircraft wing box according to claim 3, wherein the elastomeric seal further comprises a flat sealing surface which is compressed between the partition and the support member, and is flat in its uncompressed state.

8. An aircraft wing box according to claim 1, further comprising a rib positioned between and fixed to the first and second covers, wherein an end of the partition is substantially fixed to the rib such that relative movement between the partition and the first cover is substantially restricted at said end.

9. An aircraft wing box according to claim 8, comprising a second rib positioned between and fixed to the first and second covers, wherein a second end of the partition is substantially fixed to the second rib such that relative movement between the partition and the first cover is substantially restricted at said second end.

10. An aircraft wing box according to claim 1, wherein the wing box has a spanwise direction extending from an inboard root to an outboard tip, and wherein the partition extends in a direction having a spanwise component.

11. An aircraft wing box according to claim 10, wherein the partition extends in the spanwise direction.

12. An aircraft wing box according to claim 1, wherein the partition is rigid.

13. An aircraft wing box according to claim 1, wherein the partition comprises a diaphragm with a planar web.

14. An aircraft wing box according to claim 1, wherein the second joint is a second slip joint configured to inhibit fuel leakage across the second slip joint whilst permitting relative movement between the partition and the second cover.

15. An aircraft wing box according to claim 1, comprising:
forward and aft spars, wherein each cover is attached to each spar;
inboard and outboard ribs, wherein each rib is joined to each cover, joined to the partition and joined to one or both of the spars.

16. An aircraft wing box according to claim 1, wherein the first cover and/or the second cover includes a manhole.

17. An aircraft comprising a wing box according to claim 1.

18. A method of accessing a bay of the aircraft wing box of claim 16, comprising:
accessing the wing box through the manhole in the first or second cover,
disconnecting the partition from the first and second covers, and
removing the partition to provide access to the bay.

19. An aircraft wing box, comprising:
a fuel tank with a fuel-tight boundary;
upper and lower covers;
forward and aft spars;
inboard and outboard ribs; and
a partition, wherein:
each cover is attached to each spar;
each rib is joined to each cover, joined to the partition and joined to one or both of the spars;
each cover is joined to the partition by a respective partition-cover joint;
the partition provides part of the fuel-tight boundary of the fuel tank; and
at least one of the partition-cover joints is a slip joint which permits relative movement between the cover and the partition, and is sealed to inhibit fuel leakage out of the fuel tank across the slip joint;
wherein the slip joint includes an elastomeric seal configured to inhibit fuel leakage across the slip joint;
wherein the slip joint includes a pair of retainer plates supporting the elastomeric seal; and,
wherein the pair of retainer plates mates with opposing sides of the partition.

20. An aircraft wing box according to claim 1, further comprising a stringer having a stringer foot attached to the slip joint for supporting the slip joint.

\* \* \* \* \*